United States Patent [19]

Schmitt

[11] Patent Number: 5,308,087

[45] Date of Patent: May 3, 1994

[54] CASSETTE SEAL

[75] Inventor: Wolfgang Schmitt, Viernheim, Fed. Rep. of Germany

[73] Assignee: Firma Carl Freudenberg, Weinheim, Fed. Rep. of Germany

[21] Appl. No.: 900,982

[22] Filed: Jun. 18, 1992

[30] Foreign Application Priority Data

Jul. 24, 1991 [DE] Fed. Rep. of Germany ....... 4124521

[51] Int. Cl.$^5$ ............................................. F16J 15/16
[52] U.S. Cl. .................................. 277/14 R; 277/25; 277/35; 277/67; 277/152
[58] Field of Search ................... 277/13, 14 R, 25, 35, 277/53, 67, 133, 152, 153, 22

[56] References Cited

U.S. PATENT DOCUMENTS

| 3,510,138 | 5/1970 | Bowen et al. | 277/35 |
| 4,432,557 | 2/1984 | Drucktenhengst | 277/35 X |
| 4,484,752 | 11/1984 | Bentley | 277/177 X |
| 4,721,312 | 1/1988 | Hornberger | 277/153 X |
| 4,746,128 | 5/1988 | Freiwald | 277/152 X |
| 4,856,794 | 8/1989 | Boyers et al. | 277/152 X |

FOREIGN PATENT DOCUMENTS

| 0267353 | 5/1988 | European Pat. Off. | |
| 3902058 | 7/1990 | Fed. Rep. of Germany | 277/14 R |
| 0444056 | 7/1964 | Japan | 277/67 |
| 1566144 | 5/1990 | U.S.S.R. | 277/13 |
| 0662150 | 12/1951 | United Kingdom | 277/67 |

Primary Examiner—William A. Cuchlinski, Jr.
Assistant Examiner—John L. Beres
Attorney, Agent, or Firm—Kenyon & Kenyon

[57] ABSTRACT

A cassette seal, comprising an outer ring and an inner ring of an opposing angular profile, which mutually surround an annular space having an imaginary concentric axis. The outer ring is provided with at least one sealing lip abutting on the inner ring. Also a gap connection is provided between the annular space and the space to be sealed off. This gap connection is limited on one side by a flange connected to the inner ring 2. With respect to its cross-section, the gap connection is widened on the side turned away from the flange in segmental cut-outs of the outer ring that are uniformly distributed over the circumference. These segmental cut-outs constitute ducts connecting the annular space and the space to be sealed off. These ducts are limited in the axial direction on the side facing the flange by a conically inclined run-off surface. This run-off surface constitutes a part of a diameter that concentrically surrounds the axis and is extended in a funnel shape in the direction of the annular space. The run-off surface completely surrounds the flange in the axial direction and at least partially surrounds the sealing lip.

9 Claims, 2 Drawing Sheets

CASSETTE SEAL

BACKGROUND OF THE INVENTION

The present invention relates to a cassette seal having means for improving cooling and lubrication of its sealing lip.

A known cassette seal is disclosed in European Patent Application EP 0 267 353. This type of cassette seal, however, does not exhibit a sufficiently long service life. This is due to the fact that the medium discharged in the radial direction to the outside as a result of centrifugal forces does not satisfactorily contribute to the cooling and lubrication of the sealing lip.

An object of the present invention is to further develop a cassette seal of the type mentioned above in order to obtain considerably improved working properties, particularly at high shaft speeds and accompanying high temperatures. By improving the cooling and lubrication of the sealing lip, the cassette seal demonstrates a clearly improved service life.

SUMMARY OF THE INVENTION

This and other objectives are met by the cassette seal of the present invention. In this cassette seal, the inclined run-off surface completely surrounds the flange in the axial direction and at least partially surrounds the sealing lip. Advantageously, all of the medium to be sealed is discharged in the radial direction to the outside by centrifugal forces. This medium always comes up against the inclined run-off surface, which constitutes a component part of the outer ring, and is carried along this run-off surface in the direction of the annular space. Significant improvements result in the cooling and lubrication of the sealing lip.

Also, the cassette seal can be adapted to widely varying conditions of a particular application simply by replacing the outer ring. Both the deformation of the cassette seal in the radial direction, as well as the flow of lubricant in the direction of the sealing lip can be effectively varied.

The run-off surface can form an angle of 30° to 80° with a preferred angle of 45° to 60° with the longitudinal axis. The inclination of the run-off surface and the deformation of the cassette seal in the radial direction have a direct correlation. In an improvement of the present invention, the run-off surface forms the largest possible angle with the axis while providing sensible dimensions for the cassette seal. The medium penetrating through the gap connection, is centrifuged by the centrifugal force of the inner ring and the flange premolded in one piece on this ring in the radial direction against the inclined run-off surface of the outer ring. Then, this medium attains the sealing lip, which defines the annular space and abuts against the rotating inner ring during normal use. Both cooling as well as lubricating effects result from cassette seals developed in this manner.

In another improvement of the present invention, the run-off surface has an extension running in the radial direction and essentially forms a common radial plane with the flange. The extension has at least one seal that can be adjoined to an axially adjacent sealing surface on the side facing the space to be sealed off. A cassette seal designed in this manner comprises a sealing lip that is subjected to dynamic stress and a seal that is subjected to static stress. When both seals are secured to the outer part, the range of applications is considerably improved and the assembly and production are simplified. Many variations of a combination of statically and dynamically stressed sealing systems can be realized, which are both secured to the rigid outer part.

The sealing lip and the seal can be designed as one piece. The outer part, which can be formed of a metallic material or plastic, can be produced simply and economically as a result of the one-piece seal construction. The seals can be realized in many different types of forms and can be made of various materials.

The cassette seal of the present invention can be used as a combined crankshaft and locking-cover seal for an internal combustion engine. It is an advantage that the cassette seal statically seals the locking cover as well as dynamically seals the crankshaft in a motor housing. The simple configuration of the cassette seal's component parts makes a reliable assembly possible, because assembly errors are avoided. Even a particularly sensitive sealing lip, which abuts on the relatively movable inner ring when dynamically stressed, is protected with such an improvement. A further feature of the present invention is that the surface of the crankshaft in the vicinity of the sealing lip does not require any special machining. There is no relative movement of parts that contact one another between the sealing lip and the crankshaft. The seal, which is configured in the extension on the side facing the space to be sealed off, can adjoin the engine block on the outside, for example, and seals off the space to be sealed from the environment.

DETAILED DESCRIPTION

Figure 1:
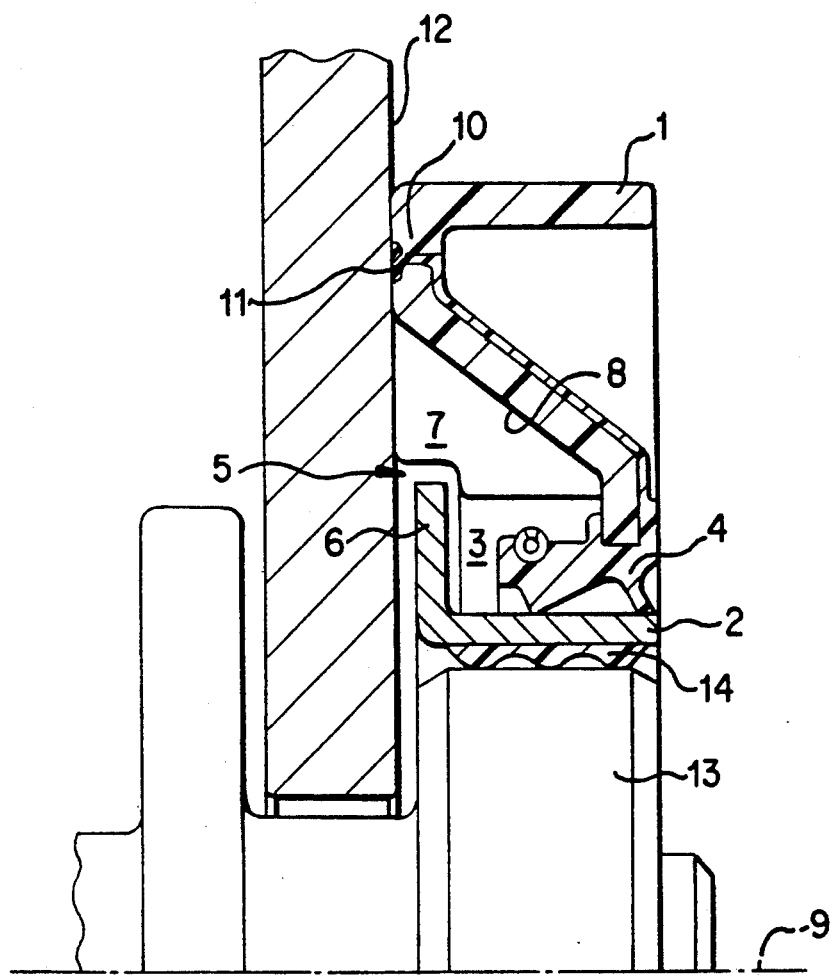
FIG. 1 shows a cassette seal constructed according to the present invention, in which the outer ring is provided with a sealing lip corresponding to the usual radial shaft-seal rings, and a static seal premolded in one piece on the sealing lip in the area of the extension.

An embodiment of the present invention is shown in FIG. 1. The sealing lip 4 and the seal 11, which are designed as one piece, are formed of elastic material that has been premolded in its liquid state on the preformed outer ring 1 and solidified. The cassette seal essentially comprises an outer ring 1 and an inner ring 2, which together define an annular space 3. The inner ring 2 has a statically stressed seal 14 formed by several sealing lips adjoining one another in the axial direction on the surface of the inner ring 2 facing the radial direction toward the crankshaft 13. The surface of the inner ring 2, which is turned in the radial direction away from the crankshaft 13 and toward the outer ring 1, is designed as a gliding surface and is abutted by the sealing lip 4. A gap connection 5 is provided between the sealed-off space and the annular space 3, which is limited by a flange 6. This flange 6 has been premolded in one piece on the inner ring 2 and points substantially radially in the direction of the outer part 1. The flange 6 projects up into the area of segmental cut-outs 7, which are uniformly distributed over the inner circumference of the outer ring 1 and constitute the annular space 3 and the ducts connecting the space to be sealed off.

The outer ring 1 is constructed in the area of the ducts in a way that mutually limits the ducts by an inclined run-off surface 8. In this example, the run-off surface 8 forms an angle of about 45° with the axis 9, which is concentrically surrounded by the outer ring 1 and the inner ring 2. This variable directly affects the dimensions of the cassette seal in the radial direction. Angles deviating from this value, especially angles from 45° up to nearly 90°, result in an appreciably better service life of the cassette seal according to the present invention. However, larger angle values also result in larger dimensions for the cassette seal in the radial direction. The selection of values for the angle of inclination of the run-off surface 8 and the dimensions of the cassette seal in the radial direction in a particular case will depend on the specific installation conditions. Generally, it can be said, that the inclination of the run-off surface 8 should be selected to be as great as possible while allowing for all marginal conditions.

The effective operation of the cassette seal is due to the run-off surface 8 surrounding the flange 6 and the sealing lip 4, at least over the upper circumferential half. This guarantees that the entire free-flowing medium, which is centrifuged as a result of the rotation of the crankshaft on to the inclined run-off surface, is supplied to the dynamically stressed sealing lip 4 to provide lubrication and effective cooling. Furthermore, the segmental cut-outs 7 are configured and formed in such a way that the entire liquid volume contained in the annular space 3 undergoes a continuous circulation and renewal. The lubricating effect of the medium is also completely retained as a result of the relatively low temperatures. The operation of the cassette seal of the present invention removes deposits in the area of the sealing lip.

In this embodiment, the run-off surface 8 is lengthened by an extension 10, roughly situated in the same radial plane as the flange 6. The flange 6 limits the gap connection 5 between the sealed-off space and the annular space 3. The extension 10 has a seal 11 that protrudes in the direction of the space to be sealed off, in this case a motor housing. The extension is joined to the axially adjacent sealing surface 12 of the motor housing. To provide an improved static sealing action, the seal 11 can also have several sealing lips.

Figure 2:
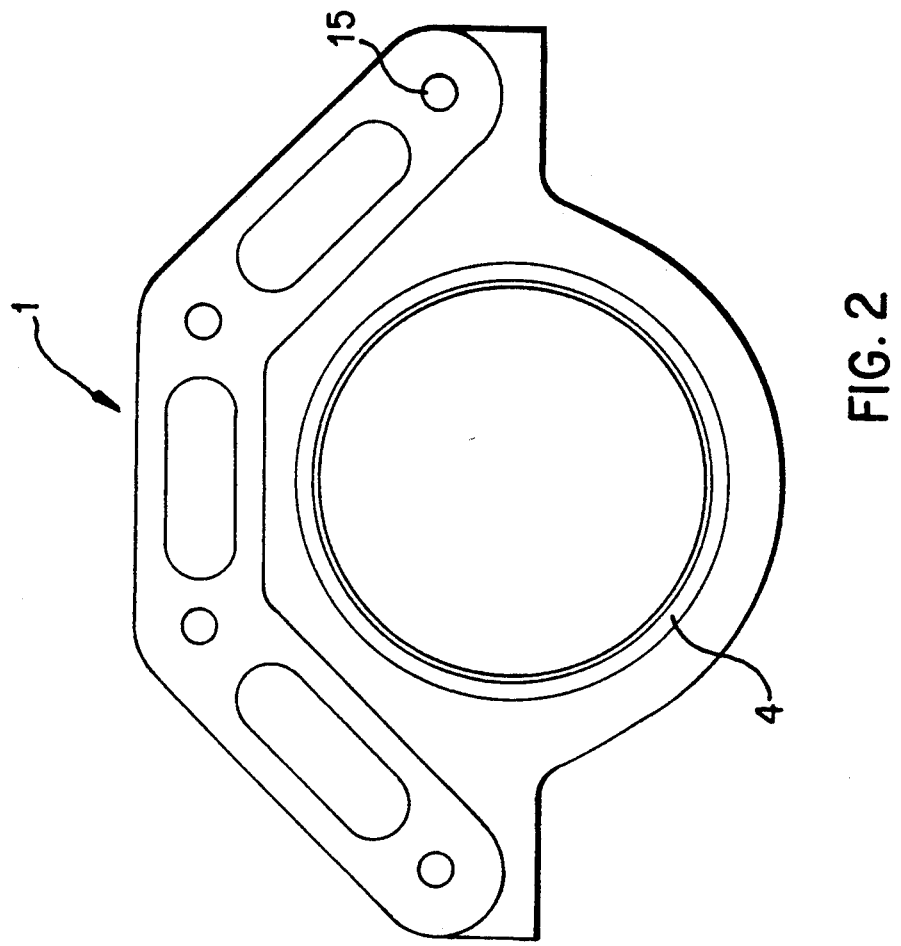
FIG. 2 shows another view of the cassette seal according to the invention.

Referring to FIG. 2, another view of the cassette seal of the present invention is shown. In this embodiment, the cassette seal is designed as a flange cassette and can be axially secured to the motor housing through several screw connections 15. Besides the reliable static and dynamic sealing of the motor housing and the crankshaft by only one component part, a simple and problem-free assembly of the cassette seal is realized and exhibits simple, economical manufacturing and excellent working properties over a long service life. Besides the refinement of the cassette seal as a flange cassette depicted here, in another embodiment, for example, the outer ring 1 can also be snapped into the slot of an adjoining housing, retaining the advantageous effects described above.

What is claimed:

1. A cassette seal for sealing off a space to be sealed, comprising:
    an outer ring positioned around a longitudinal axis and having at least one sealing lip;
    an inner ring positioned around said longitudinal axis and having an annular profile opposite to an annular profile of said outer ring, said inner and outer rings surrounding an annular space having an imaginary concentric axis, said sealing lip abutting said inner ring;
    said outer and inner rings forming a gap connection between said annular space and the space to be sealed off by the cassette seal;
    a flange radially coupled to said inner ring and limiting said gap connection, said gap connection being wider on a side of said gap connection turned away from said flange in a plurality of segmental cut-outs uniformly distributed over the circumference of the outer ring, said plurality of segmental cut-outs functioning as ducts between the annular space and the space to be sealed off; and
    a conically inclined run-off surface forming a part of a diameter concentrically surrounding said axis and extending in a funnel shape toward said annular space, said ducts being limited in an axial direction on a side facing said flange by said run-off surface, said run-off surface forming an angle with said longitudinal axis such that said run-off surface completely surrounds said flange in the axial direction and partially surrounds said sealing lip.

2. The cassette seal of claim 1, wherein said run-off surface forms an angle of 30° to 80° with the longitudinal axis.

3. The cassette seal of claim 2, wherein said run-off surface forms an angle of 45° to 60° with the longitudinal axis.

4. A cassette seal for sealing off a space to be sealed, comprising:
    an outer ring positioned around a longitudinal axis and having at least one sealing lip;
    an inner ring positioned around said longitudinal axis and having an annular profile opposite to an annular profile of said outer ring, said inner and outer rings surrounding an annular space having an imaginary concentric axis, said sealing lip abutting said inner ring;
    said outer and inner rings forming a gap connection between said annular space and the space to be sealed off by the cassette seal;
    a flange radially coupled to said inner ring and limiting said gap connection, said gap connection being wider on a side of said gap connection turned away from said flange in a plurality of segmental cut-outs uniformly distributed over the circumference of the outer ring, said plurality of segmental cut-outs functioning as ducts between the annular space and the space to be sealed off; and
    a conically inclined run-off surface forming a part of a diameter concentrically surrounding said axis and extending in a funnel shape toward said annular space, said run-off surface forming an angle of 30° to 80° with said axis, said ducts being limited in an axial direction on a side facing said flange by said run-off surface, said run-off surface completely surrounding said flange in the axial direction and partially surrounding said sealing lip, wherein said run-off surface includes an extension running in the radial direction and forming a common radial plane with the flange, said extension having at least one seal that is capable of being adjoined to an axially adjacent sealing surface on a side of said extension facing the space to be sealed off.

5. The cassette seal of claim 4, wherein said sealing lip and said seal are designed as one piece.

6. The cassette seal of claim 5, further comprising a motor housing and combined crankshaft and locking-cover for an internal combustion engine, where said cassette seal is coupled to said motor housing.

7. The cassette seal of claim 4, wherein said run-off surface forms an angle of 45° to 60° with the longitudinal axis.

8. The cassette seal of claim 7, wherein said sealing lip and said seal are designed as one piece.

9. The cassette seal of claim 8, further comprising a motor housing and combine crankshaft and locking-cover for an internal combustion engine, where said cassette seal is coupled to said motor housing.

* * * * *